United States Patent [19]

Kuwabara et al.

[11] Patent Number: 4,840,973

[45] Date of Patent: Jun. 20, 1989

[54] POLYPROPYLENE RESIN PREFOAMED PARTICLES

[75] Inventors: Hideki Kuwabara, Hadano; Shohei Yoshimura, Tomioka, both of Japan

[73] Assignee: Japan Styrene Paper Corporation, Tokyo, Japan

[21] Appl. No.: 82,560

[22] Filed: Aug. 7, 1987

Related U.S. Application Data

[63] Continuation-in-part of Ser. No. 858,868, May 1, 1986, abandoned, which is a continuation of Ser. No. 764,979, Aug. 13, 1985, abandoned, which is a continuation of Ser. No. 592,559, Mar. 23, 1984, abandoned.

[30] Foreign Application Priority Data

Mar. 25, 1983 [JP] Japan .................................. 58-50048
Apr. 19, 1983 [JP] Japan .................................. 58-68999

[51] Int. Cl.[4] .............................. C08J 9/22; C08J 9/24
[52] U.S. Cl. ........................................ 521/58; 521/56; 521/60
[58] Field of Search ............................ 521/56, 60, 58

[56] References Cited

U.S. PATENT DOCUMENTS

| | | | |
|---|---|---|---|
| 4,379,859 | 4/1983 | Hirosawa et al. ..................... | 521/59 |
| 4,399,087 | 8/1983 | Akiyama et al. ..................... | 264/53 |
| 4,415,680 | 11/1983 | Ushirokawa et al. ................ | 521/56 |
| 4,436,840 | 3/1984 | Akiyama et al. ..................... | 521/58 |
| 4,440,703 | 4/1984 | Akiyama et al. ..................... | 264/50 |
| 4,567,208 | 1/1986 | Kuwabara et al. .................. | 521/59 |
| 4,587,270 | 5/1986 | Kuwabara et al. .................. | 521/58 |

Primary Examiner—Morton Foelak
Attorney, Agent, or Firm—Sherman and Shalloway

[57] ABSTRACT

Prefoamed particles consisting essentially of an ethylene/propylene random copolymer, wherein said prefoamed particles are obtained by foaming particles of an ethylene/propylene random copolymer containing 1 to 4% by weight of random-copolymerized ethylene at a temperature in the range of from Tm - 15° C. to Tm - 5° C. (in which Tm is a temperature at which to terminate melting of the copolymer) and within the range of 141° to 151° C., and wherein said prefoamed particles have a crystal structure characterized in that in a DSC curve obtained by heating 1 to 3 mg of the copolymer prefoamed particles to 220° C. at a heating rate of 10° C./min. with a differential scanning calorimeter, there appear a peak (characteristic peak) characteristic of the copolymer and another peak (high temperature peak) at a higher temperature than a temperature at which the characteristic peak appears.

3 Claims, No Drawings

POLYPROPYLENE RESIN PREFOAMED PARTICLES

This application is a continuation-in-part application of Ser. No. 858,868, filed May 1, 1986 now abandoned which is a continuation of Ser. No. 764,979 filed Aug. 13, 1985, now abandoned, which is a continuation of Ser. No. 592,559 filed Mar. 23, 1984, now abandoned.

This invention pertains to polypropylene resin prefoamed particles having good in-mold moldability.

So-called bead expanded articles (in-mold expanded articles) obtained by filling prefoamed particles in a mold and heat-expanding them have found wide acceptance in cushioning materials, packages, heat-insulating materials, building materials, etc. because of their excellent cushioning properties, heat-insulating properties, etc., and the demand thereof has been lately much increased.

In-mold expanded articles made of polystyrene prefoamed particles have been so far known as this type of expanded articles. However, said articles have a fatal defect of brittleness and further a defect a inferiority in chemical resistance. The improvement of these defects has been long desired. In-mold expanded articles made from cross-linked polyethylene prefoamed particles have been proposed to remedy such defects. In this instance, it is nevertheless hard to obtain low-density (highly expanded) articles by in-mold expansion. When an attempt is made to prepare low-density molded articles, the resulting articles have a notable shrinkage, great water absorption and poor properties. Molded articles that can be put to practical use have not been obtainable.

The present inventors have therefore focussed their attention on excellent properties of polypropylene resins and made studies for making in-mold expanded articles from polypropylene resin prefoamed particles to remedy the defects associated with the conventional in-mold expanded articles. However, in producing in-mold expanded articles from polypropylene resin prefoamed particles, there have been sometimes obtained expanded articles having a low density (high expansion), low water absorption, low shrinkage and excellent dimensional stability, but at other times only expanded articles having a great shrinkage. Thus, stable good expanded articles could not have been altogether produced.

The present inventors have further made extensive studies to look into the cause thereof, and consequently found that a good in-mold expanded article is obtained when polypropylene resin prefoamed particles used in the in-mold expansion molding are prepared from a specific ethylene/propylene random copolymer and have such a crystal structure that in a DSC curve obtained by the measurement with a differential scanning calorimeter, there appear a peak characteristic of the copolymer and a high temperature peak at a higher temperature than a temperature at which the characteristic peak appears.

Thus, the present invention provides prefoamed particles consisting essentially of an ethylene/propylene random copolymer, wherein said prefoamed particles are obtained by foaming particles of an ethylene/propylene random copolymer containing 1 to 4% by weight of random-copolymerized ethylene at a temperature in the range of from Tm - 15° C. to Tm - 5° C. (in which Tm is a temperature at which to terminate melting of the copolymer) and within the range of 141° to 151° C., and wherein said prefoamed particles have a crystal structure characterized in that in a DSC curve obtained by heating 1 to 3 g of the copolymer prefoamed particles to 220° C. at a heating rate of 10° C./min. with a differential scanning calorimeter, there appear a peak (characteristic peak) characteristic of the copolymer and another peak (high temperature peak) at a higher temperature than a temperature at which the characteristic peak appears.

In the present invention, the DSC curve obtained by measuring the ethylene/propylene random copolymer prefoamed particles with the differential scanning calorimeter means a DSC curve given when 1 to 3 mg of the copolymer prefoamed particles is heated to 220° C. at a heating range of 10° C./min with the differential scanning calorimeter. For instance, a DSC curve given when a sample is heated from room temperature to 220° C. at a heating rate of 10° C./min is designated a first DSC curve, and then a DSC curve given when the sample is cooled from 220° C. to about 40° C. at a cooling rate of 10° C./min and subsequently heated again to 220° C. at a heating rate of 10° C./min is designated a second DSC curve. A characteristic peak and a high temperature peak can be found from these DSC curves.

The characteristic peak here referred to is a heat atmosphere peak characteristic of a polypropylene resin making up foamed particles, and is considered ascribable to what is called a heat absorption of the polypropylene resin at the point of melting. Said characteristic peak appears in both the first and second DSC curves. The temperatures at the peaks in the first and second DSC curves are at times slightly different, yet the difference is less than 5° C. and usually less than 2° C.

The high temperature peak here referred to is a heat absorption peak appearing at a higher temperature than that of the characteristic peak in the first DSC curve. Polypropylene resin prefoamed particles wherein the high temperature peak does to appear in the DSC curve have a poor in-mold expansion moldability and cannot provide good expanded articles. The above high temperature peak is presumed to be attributable to the presence of a crystal structure different from the structure showing the characteristic peak. Said high temperature peak appears in the first DSC curve, but does not appear in the second DSC curve obtained by heating under the same conditions. Accordingly, the structure showing the high temperature peak is one which the ethylene/propylene random copolymer prefoamed particles of this invention possess. It is not given by heating with the differential scanning calorimeter.

It is desirous that the difference between the temperature of the characteristic peak appearing in the second DSC curve and the temperature of the high temperature peak appearing in the first DSC curve is great. The difference therebetween is 5° C. or above, preferably 10° C. or above.

The ethylene/propylene random copolymer prefoamed particles of this invention can be afforded by charging a sealed vessel with 100 parts by weight of the copolymer particles, 100 to 400 parts by weight of water, 5 to 30 parts by weight of a volatile blowing agent (e.g. dichlorodifluoromethane) and 0.1 to 3 parts by weight of a dispersant (e.g. finely divided aluminum oxide), heating the mixture to a temperature in the range of from Tm - 15° C. to Tm - 5° C. (Tm is a temperature at which to terminate melting of the copolymer) and within the range of 141° to 151° C., then opening one end of the vessel, releasing said resin particles and water from inside the vessel to an atmosphere held at a lower pressure than that of the vessel and expanding the resin particles.

To explain the temperature (Tm) at which to terminate melting, 6 to 8 mg of a sample is heated to 220° C. at a heating rate of 10° C./min with a differential scanning calorimeter, then cooled to about 40° C. at a cooling rate of 10° C./min and heated again to 220° C. at a heating rate of 10° C./min. The temperature (Tm) means a temperature given when the heat absorption in the DSC curve obtained by the second heating is returned to a position of a base line.

There can be obtained, as aforesaid, the prefoamed particles of this invention having a structure that the characteristic peak and the high temperature peak appear in the DSC curve by defining the expansion temperature in the above fixed temperature range which is less than the temperature (Tm) at which to terminate melting. Where the expansion temperature deviates from the above range, the characteristic peak only appears in the DSC curve of the resulting prefoamed particles without the high temperature peak.

Bead expanded articles (in-mold expanded articles) can be produced by pressurizing the above obtained prefoamed particles of this invention with an inorganic gas such as air, filling the pressurized particles into a mold and heat-expanding them with steam of 3 to 4 $kg/cm^2(G)$. The bead expanded articles are also characterized in that the characteristic peak and the high temperature peak which are approximately the same as those in the prefoamed particles used as the starting material appear in the DSC curve.

The following Examples and Comparative Examples illustrate this invention specifically. Parts in the respective Examples and Comparative Examples are all on the weight basis.

EXAMPLES 1–5 AND COMPARATIVE EXAMPLES 1–6

A sealed vessel was charged with 300 parts of water, 100 parts of ethylene/propylene random copolymer particles, 0.3 part of ultrafine aluminum oxide as a dispersant and a given amount of a volatile blowing agent indicated in Table 1. The mixture was heated with stirring. After the reaction mixture was maintained for 30 minutes at an expansion temperature indicated in Table 1, one end of the vessel was opened while keeping the pressure in the inside of the vessel at 30 $kg/cm^2$ with a nitrogen gas, and the resin particles and water were released to an open atmosphere at the same time. The resin particles were expanded to afford prefoamed particles having an apparent expansion ratio (bulk ratio) indicated in Table 1.

With respect to the prefoamed particles, using a differential scanning calorimeter (DT-30 Model, an apparatus manufactured by Schimazu Seisakusho), the first measurement was conducted by heating said particles to 220° C. at a heating rate of 10° C./min, and subsequently the second measurement was conducted by cooling said particles to 40° C. at a cooling rate of 10° C./min and heating them again to 220° C. at a heating rate of 10° C./min.

A DSC curve for the prefoamed particles in Example 1 is represented in FIG. 1, and a DSC curve for the prefoamed particles in Comparative Example 3 in FIG. 2, respectively.

In FIGS. 1 and 2, the full line shows the DSC curve obtained in the first measurement and the dashed line the DSC curve obtained in the second measurement, respectively.

In the individual DSC curves obtained for the prefoamed particles in Examples 1-5, a difference ($\Delta T$) between the temperature of the characteristic peak (a) appearing in the second DSC curve and the temperature of the high temperature peak (b) appearing in the first DSC curve was found, and the results are indicated in Table 1.

Subsequently, the prefoamed particles in Examples 1-5 and Comparative Examples 1-6 were pressurized for 24 hours with air held at 2 $kg/cm^2(G)$ and then filled in a mold having an internal size of 50 mm × 300 mm × 300 mm. Said particles were heat-expanded with steam held at 3.2 $kg/cm^2(G)$. Each of the resulting expanded articles was dried in an oven kept at 80° C. for 24 hours and slowly cooled to room temperature. Thereafter, an expansion ratio, shrinkage and water absorption were measured for the resulting articles. A melt adhesion was also estimated depending on a water absorption. The results are indicated in Table 1.

TABLE 1

| | Polymer | | Prefoaming conditions | | | |
|---|---|---|---|---|---|---|
| | Tm (°C.) | Ethylene contents in ethylene-propylene random-copolymers (wt. %) | Volatile blowing agent Type | Amount (parts) | Maximum temperature in the inside of the vessel (°C.) | Expansion temperature (°C.) |
| Example | | | | | | |
| 1 | 153 | 2.0 | Dichloro-difluoro-methane | 18 | 146 | 146 |
| 2 | 153 | 2.0 | Dichloro-difluoro-methane | 20 | 143 | 143 |
| 3 | 157 | 1.2 | Dichloro-difluoro-methane | 20 | 151 | 151 |
| 4 | 148 | 2.8 | Dichloro-difluoro-methane | 18 | 141 | 141 |
| 5 | 146 | 3.2 | Dichloro-difluoro-methane | 18 | 143 | 141 |
| Comparative Example | | | | | | |
| 1 | 153 | 2.0 | Dichloro- | 8 | 152 | 152 |

TABLE 1-continued

| | | | | | | |
|---|---|---|---|---|---|---|
| 2 | 153 | 2.0 | difluoro-methane Dichloro-difluoro-methane | 30 | 125 | 125 |
| 3 | 153 | 2.0 | Dichloro-difluoro-methane | 16 | 160 | 125 |
| 4 | 162 | 0.8 | Dichloro-difluoro-methane | 16 | 160 | 125 |
| 5 | 140 | 4.0 | Dichloro-difluoro-methane | 16 | 140 | 137 |
| 6 | 147 | 3.0 | Dichloro-difluoro-methane | " | 145 | 137 |

| | Prefoamed particles | | | Moldability | | | |
|---|---|---|---|---|---|---|---|
| | Bulk ratio | High temperature peak | ΔT °C. | Expansion ratio | Shrin-kage[*1] | Melt adhesion Water absorption[*2] | Estimation |
| Example | | | | | | | |
| 1 | 45 | Yes | 13 | 43 | O | less than 0.003 g/cm$^3$ | Melt adhesion is good |
| 2 | 25 | Yes | 12 | 24 | O | less than 0.003 g/cm$^3$ | Melt adhesion is good |
| 3 | 20 | Yes | 11 | 19 | O | less than 0.003 g/cm$^3$ | Melt adhesion is good |
| 4 | 30 | Yes | 12 | 28 | O | less than 0.003 g/cm$^3$ | Melt adhesion is good |
| 5 | 35 | Yes | 13 | 33 | O | less than 0.003 g/cm$^3$ | Melt adhesion is good |
| Comparative Example | | | | | | | |
| 1 | 12 | No | — | 7 | X | at least 0.03 g/cm$^3$ | Melt adhesion is poor |
| 2 | 3 | No | — | Molding impossible (No molded article resulted) | | | Melt adhesion is poor |
| 3 | 38 | No | — | 26 | X | at least 0.03 g/cm$^3$ | Melt adhesion is poor |
| 4 | 30 | No | — | 25 | X | at least 0.03 g/cm$^3$ | Melt adhesion is poor |
| 5 | 10 | No | — | 7 | X | at least 0.03 g/cm$^3$ | Melt adhesion is poor |
| 6 | 10 | No | — | 8 | X | at least 0.03 g/cm$^3$ | Melt adhesion is poor |

[*1] Indicates that percent decrease of a size in a surface direction of an expanded article relative to a size of a mold (50 mm × 300 mm × 300 mm) is less than 3%, and X indicates that said percent decrease is 3% or more.
[*2] Measured according to JIS K6767 B method.

EXAMPLES 6-11 AND COMPARATIVE EXAMPLES 7-11

A sealed vessel was charged with 300 parts of water, 100 parts of ethylene/propylene random copolymer particles, 0.3 part of ultrafine aluminum oxide as a dispersant and a given amount of a volatile blowing agent indicated in Table 2. The mixture was heated with stirring. After the reaction mixture was maintained at an expansion temperature indicated in Table 2 for 30 minutes, one end of the vessel was opened while keeping the pressure in the inside of the vessel at 30 kg/cm$^2$(G) with a nitrogen gas. The resin particles and water were released to an open atmosphere at the same time, and the resin particles were expanded to afford prefoamed particles.

A similar DSC curve as shown in FIG. 1 was obtained for the prefoamed particles in Examples 6-11, and a similar DSC curve as shown in FIG. 2 for the prefoamed particles in Comparative Examples 7-11, respectively.

The prefoamed particles were pressurized for 48 hours with air held at 2 kg/cm$^2$(G), filled in a mold having an internal size of 50 mm×300 mm×300 mm and heat-expanded with a steam held at 3.2 kg/cm$^2$(G).

Each of the thus obtained in-mold expanded articles was dried for 24 hours in an oven kept at 60° C. and slowly cooled to room temperature.

As for the respective expanded articles, using a differential scanning calorimeter (DT-30 Model, an apparatus manufactured by Shimazu Seisakusho), the first measurement was conducted by heating said article to 220° C. at a heating rate of 10° C./min, and the second measurement by cooling said article to 40° C. at a cooling rate of 10° C./min and heating it again to 220° C. at a heating rate of 10° C./min.

A DSC curve for the in-mold expanded article in Example 6 is represented in FIG. 3 and a DSC curve for the in-mold expanded article in Comparative Example 7 in FIG. 4, respectively. In FIGS. 3 and 4, the full line indicates the DSC curve obtained by the first measurement and the dashed line the DSC curve obtained by the second measurement, respectively.

In the individual DSC curves obtained for the in-mold expanded articles in Examples 6-11, a different (ΔT) between the temperature of the characteristic peak (a) appearing in the DSC curve of the second DSC curve and the temperature of the high temperature peak (b) appearing in the first DSC curve was found, and the result are indicated in Table 2.

respective in-mold expanded articles, and the results are indicated in Table 2.

TABLE 2

|  | Polymer | | Prefoaming conditions | | | |
|---|---|---|---|---|---|---|
|  | Tm (°C.) | Ethylene contents in ethylene-propylene random copolymer (wt. %) | Volatile blowing agent | | Maximum temperature in the inside of the vessel (°C.) | Expansion temperature (°C.) |
|  |  |  | Type | Amount (parts) |  |  |
| Example 6 | 157 | 1.2 | Dichloro-difluoro-methane | 20 | 145 | 145 |
| Example 7 | 157 | 1.2 | Dichloro-difluoro-methane | 18 | 143 | 143 |
| Example 8 | 157 | 1.2 | Dichloro-difluoro-methane | 7.4 | 145 | 145 |
|  |  |  | Trichloro-fluoro-methane | 12.6 |  |  |
| Example 9 | 153 | 2.0 | Dichloro-difluoro-methane | 18 | 146 | 146 |
| Example 10 | 148 | 2.8 | Dichloro-difluoro-methane | 18 | 141 | 141 |
| Example 11 | 146 | 3.2 | Dichloro-difluoro-methane | 18 | 141 | 141 |
| Comparative Example 7 | 157 | 1.2 | Dichloro-difluoro-methane | 16 | 160 | 126 |
| Comparative Example 8 | 157 | 1.2 | Dichloro-difluoro-methane | 5 | 160 | 135 |
| Comparative Example 9 | 157 | 1.2 | Dichloro-difluoro-methane | 10 | 160 | 135 |
|  |  |  | Trichloro-fluoro-methane | 10 |  |  |
| Comparative Example 10 | 130 | 8.0 | Dichloro-difluoro-methane | 23 | 137 | 137 |
| Comparative Example 11 | 138 | 4.2 | Dichloro-difluoro-methane | 23 | 137 | 137 |

|  | DSC curve | | In-mold expanded article | | | |
|---|---|---|---|---|---|---|
|  | High temperature peak | ΔT (°C.) | Expansion ratio | Compression hardness*1 (kg/cm²) | Compression set*2 (%) | Water absorption*3 (g/cm³) |
| Example 6 | Yes | 13 | 45 | 0.70 | 6.0 | less than 0.003 |
| Example 7 | Yes | 11 | 20 | 1.70 | 9.0 | less than 0.003 |
| Example 8 | Yes | 17 | 32 | 1.10 | 8.2 | less than 0.003 |
| Example 9 | Yes | 13 | 43 | 0.70 | 5.5 | less than 0.003 |
| Example 10 | Yes | 12 | 28 | 1.35 | 7.9 | less than 0.003 |
| Example 11 | Yes | 13 | 33 | 1.20 | 7.8 | less than 0.003 |
| Comparative Example 7 | No | — | 31 | 0.47 | 52 | 0.03 or more |
| Comparative Example 8 | No | — | 19 | 0.74 | 45 | 0.03 or more |
| Comparative Example 9 | No | — | 25 | 0.55 | 40 | 0.03 or more |
| Comparative Example 10 | No | — | 40 | 1.0 | 40 | 0.03 or more |
| Comparative Example 11 | No | — | 40 | 0.9 | 30 | 0.03 or more |

*1 Measured according to JIS K6767.
*2 Measured according to JIS K6767.
*3 Measured according to JIS K6767 B method.

An expansion ratio, compression hardness, compression set and water absorption were measured for the As has been thus far explained, the prefoamed particles of this invention have excellent in-mold moldability because they are produced from specific ethylene/propylene random copolymer particles under specific temperature conditions and have such crystal structure that the characteristic peak of the polypropylene resin and the high temperature peak at a higher temperature than that of the characteristic peak appear in the DSC curve. That is, when the prefoamed particles are expanded in a mold, a molded article having a low density (high expansion), low water absorption and excellent compression hardness and compression set can be readily obtained without great shrinkage which is observed in an in-mold expanded article made from polypropylene resin prefoamed particles having a crystal structure that the high tempeature peak does not appear in the DSC curve. On top of that, the in-mold expanded article produced from the ethylene/propylene random copolymer prefoamed particles in this invention is not brittle and is excellent in impact strength and chemical resistance compared with an in-mold expanded article obtained from polystyrene resin prefoamed particles. Besides, the in-mold expanded article in this invention is superior to an in-mold expanded article obtained from cross-linked polyethylene prefoamed particles in that even the expanded article having a low density (high expansion) is excellent owing to a low shrinkage and water absorption.

What is claimed is:

1. Prefoamed particles consisting essentially of an ethylene/propylene random copolymer, wherein said prefoamed particles are obtained by foaming particles of an ethylene/propylene random copolymer containing 1 to 4% by weight of random-copolymerized ethylene at a temperature in the range of from Tm - 15° C. to Tm - 5° C. (in which Tm is a temperature at which to terminate melting of the copolymer) and within the range of 141° to 151° C., and wherein said prefoamed particles have a crystal structure characterized in that in a DSC curve obtained by heating 1 to 3 mg of the copolymer prefoamed particles to 220° C. at a heating rate of 10° C./min. with a differential scanning calorimeter, there appear a peak (characteristic peak) characteristic of the copolymer and another peak (high temperature peak) at a higher temperature than a temperature at which the characteristic peak appears.

2. The prefoamed particles of claim 1 wherein a difference betwen the temperature at which the characteristic peak appears and the temperature at which the high temperature peak appears is at least 5° C.

3. A bead expanded article prepared by filling the prefoamed particles of claim 1 in a mold and heat-expanding said particles.

* * * * *